United States Patent [19]
Yutaka et al.

[11] Patent Number: 5,917,504
[45] Date of Patent: Jun. 29, 1999

[54] IMAGE PROCESSING APPARATUS, SWITCHING BETWEEN IMAGES HAVING PIXELS OF FIRST AND SECOND NUMBERS OF BITS

[75] Inventors: Teiji Yutaka, Kanagawa; Masakazu Suzuoki, Tokyo; Makoto Furuhashi; Masayoshi Tanaka, both of Kanagawa, all of Japan

[73] Assignee: Sony Corporation, Tokyo, Japan

[21] Appl. No.: 08/937,245

[22] Filed: Sep. 8, 1997

Related U.S. Application Data

[63] Continuation of application No. 08/417,127, Apr. 5, 1995, abandoned.

[30] Foreign Application Priority Data

Apr. 7, 1994 [JP] Japan ................................. 6-093738

[51] Int. Cl.⁶ .................................................. G06F 13/00
[52] U.S. Cl. ............................................ 345/509; 345/501
[58] Field of Search .................................... 345/501, 502, 345/509, 513, 522, 420, 428, 419, 422, 202, 132

[56] References Cited

U.S. PATENT DOCUMENTS

| | | | |
|---|---|---|---|
| 4,845,661 | 7/1989 | Shimada .................................. | 364/900 |
| 4,953,229 | 8/1990 | Abe et al. ................................ | 382/284 |
| 5,014,129 | 5/1991 | Imanishi .................................. | 358/477 |
| 5,241,371 | 8/1993 | Fukushima et al. ..................... | 348/578 |
| 5,274,753 | 12/1993 | Roskowski et al. .................... | 345/419 |
| 5,283,866 | 2/1994 | Kumagai ................................. | 395/164 |
| 5,315,702 | 5/1994 | Kusakawa ............................... | 395/164 |
| 5,321,532 | 6/1994 | Ishikawa et al. ....................... | 358/534 |
| 5,335,321 | 8/1994 | Harney et al. .......................... | 345/501 |
| 5,542,041 | 7/1996 | Corono .................................... | 345/503 |
| 5,649,173 | 7/1997 | Lentz ...................................... | 345/513 |
| 5,664,163 | 9/1997 | Yutaka et al. ........................... | 345/522 |
| 5,781,184 | 7/1998 | Wasserman et al. .................... | 345/202 |

OTHER PUBLICATIONS

IBM Technical Disclosure Bulletin, vol. 32, No. 4B, pp. 192–193, Sep. 1989.

IBM Technical Disclosure Bulletin, vol. 34, No. 7B, Dec. 1991, New York US, pp. 29–30, XP 000282492, "Multiple Types of Graphical Contexts on a Graphics Adapter".

Electronix, vol. 35, No. 2, Jan. 1986, Munchen De, pp. 39–43, Puchta "Intelligenter Controller Für Bit–Map Graphik".

Primary Examiner—Raymond J. Bayerl
Assistant Examiner—Cao H. Nguyen
Attorney, Agent, or Firm—Frommer Lawrence & Haug, LLP.; William S. Frommer

[57] ABSTRACT

In an apparatus provided with a frame memory for sequentially reading image data written in the frame memory for image display data, an image processing apparatus includes: a recognizing section for recognizing whether the image data written in the frame memory are image data in which each pixel is written with a first bit number or image data in which each pixel is written with a second bit number that is different from the first bit number; a first image data reading section for reading the image data from the frame memory, regarding each pixel as being expressed by the first bit number; a second image data reading section for reading the image data from the frame memory, regarding each pixel as being expressed by the second bit number; and a switching section for switching the first image data reading section and the second image data reading section on the basis of the recognition information from the recognizing section.

23 Claims, 7 Drawing Sheets first transfer command

IMAGE PROCESSING APPARATUS, SWITCHING BETWEEN IMAGES HAVING PIXELS OF FIRST AND SECOND NUMBERS OF BITS

This application is a continuation of application Ser. No. 08/417,127, filed Apr. 5, 1995, now abandoned.

BACKGROUND OF THE INVENTION

1. Field of the Invention

The present invention relates to an image processing apparatus provided with a frame memory for display, and is suitable in particularly for a case where a high "visualization" performance is required in a video game machine or a graphic computer for forming an image in accordance with pictorial image data which have been compressed and transferred or pictorial image data of the computer graphics.

2. Description of the Related Art

In general, in computer graphics such as, for example, so-called 3D (three-dimensional) graphics, when an "object" having reality (which "object" means an object to be imaged) is imaged, first of all, a surface of the object is decomposed into a plurality of polygons (each of which means a minimum unit of a figure (e.g., a triangular shape or a rectangular shape) to be handled by an imaging apparatus); each polygon is sequentially imaged on a frame memory corresponding to a monitor display image field; the pictorial image data are stored in the frame memory; and the pictorial image data are read out and displayed on the monitor to thereby reconstruct an image which can be stereographically seen.

In some cases, a digital motion picture playback system in which, for example, a secondary memory device such as a CD-ROM having image data recorded in data compression and an image decompression device are used in combination is installed in parallel with such a 3D graphic system. The digital motion picture playback system is inferior in transformation property to the 3D graphic system but has an advantage that an image which is difficult to express in the 3D graphic system may be reproduced. Accordingly, the digital motion picture playback system is used as a subsystem for assisting the 3D graphic system as being used as a background image field.

By the way, in a conventional image processing apparatus provided with such a frame memory (buffer memory) for display, the number of bits of pixels of the image data to be written in the frame memory is in general kept constant. For example, in a game machine or the like, since the pictorial image through the 3D graphics does not require so high image quality, the bit number per one pixel composed of three principal color data R (red), G (green) and B (blue) is kept constant at 15 bits/pixel with 5 bits for each of R, G and B and the resolving power is fixed to 32,000 colors.

The following patent applications each of which is related to the present invention and is owned by the same assignee of the present invention are enumerated and hereby incorporated by reference.

Japanese Patent Application No. Hei 05-190764 (filed on Jul. 2, 1993);

Japanese Patent Application No. Hei 05-258625 (filed on Oct. 15, 1993); and

Japanese Patent Application No. Hei 06-027405 (filed on Jan. 31, 1994).

The U.S. applications corresponding to these Japanese applications are now pending for examination.

As described above, conventionally, the number of bits for one pixel of the frame memory is fixed. Accordingly, as described above, when the motion picture is reproduced and displayed in a system which is the combination of the 3D graphic system and the digital motion picture playback system, even if there is an extra room in a capacity of the frame memory, the bit number is made to be the 15 bits/pixel, as a result of which only the revolving power of 32,000 colors is obtained.

In consideration of the display of the motion picture, it would be possible to fix the bit number per one pixel of the frame memory with, for example, 8 bits for R, G and B and with 24 bits/pixel in order to display 16,700,000 colors. In this case, however, the memory region of the frame memory for the display is unduly increased, and this bit number is not necessary for the pictorial image of the 3D graphics. This approach would not be effective.

An object of the invention is to provide an image processing apparatus which can optimize a bit number per one pixel of a frame memory in conformity with an image quality of an image to be displayed.

SUMMARY OF THE INVENTION

In order to solve the above-described problems, in an image processing apparatus according to the present invention, there is provided, in an apparatus provided with a frame memory for sequentially reading image data written in the frame memory for image display data characterized by comprising:

recognizing means for recognizing whether the image data written in the frame memory are image data in which each pixel is written with a first bit number or image data in which each pixel is written with a second bit number that is different from the first bit number;

first image data reading means for reading the image data from the frame memory regarding each pixel as being expressed by the first bit number;

second image data reading means for reading the image data from the frame memory regarding each pixel as being expressed by the second bit number; and switching means for switching the first image data reading means and the second image data reading means on the basis of the recognition information from the recognizing means.

With the structure according to the present invention, the recognizing means recognizes whether the image data are written with the first bit number or written with the second bit number on the frame memory.

When the image data to be read from the frame memory based on the recognition information of the recognizing means are data of the first bit number/pixel, the switching means are switched to select the first image data reading means to output the image data from the frame memory. Also, when the image data to be read from the frame memory are data of the second bit number/pixel, the switching means are switched to select the second image data reading means to output the image data from the frame memory 63.

It is thus possible to optimize the image data to be read from and written to the frame memory in conformity with the image quality.

As described above, according to the present invention, it is possible to optimize the bit number per one pixel of the frame memory in response to the quality of the image to be displayed and to effectively utilize the frame memory.

In addition, according to the present invention, since the circuit for reading the image data from the frame memory is switched in response to the bits/pixel corresponding to the quality of the image quality, the frame memory itself has no adverse affect of the change of the bit number. Accordingly, it is unnecessary to use a special memory as the frame memory.

Also, if the present invention is applied to the game machine, since the motion picture or the still picture with high quality is suitably displayed in addition to the image according to the imaging command, it is possible to enjoy the game image field with higher reality.

DETAILED DESCRIPTION OF THE PREFERRED EMBODIMENTS

Figure 1:
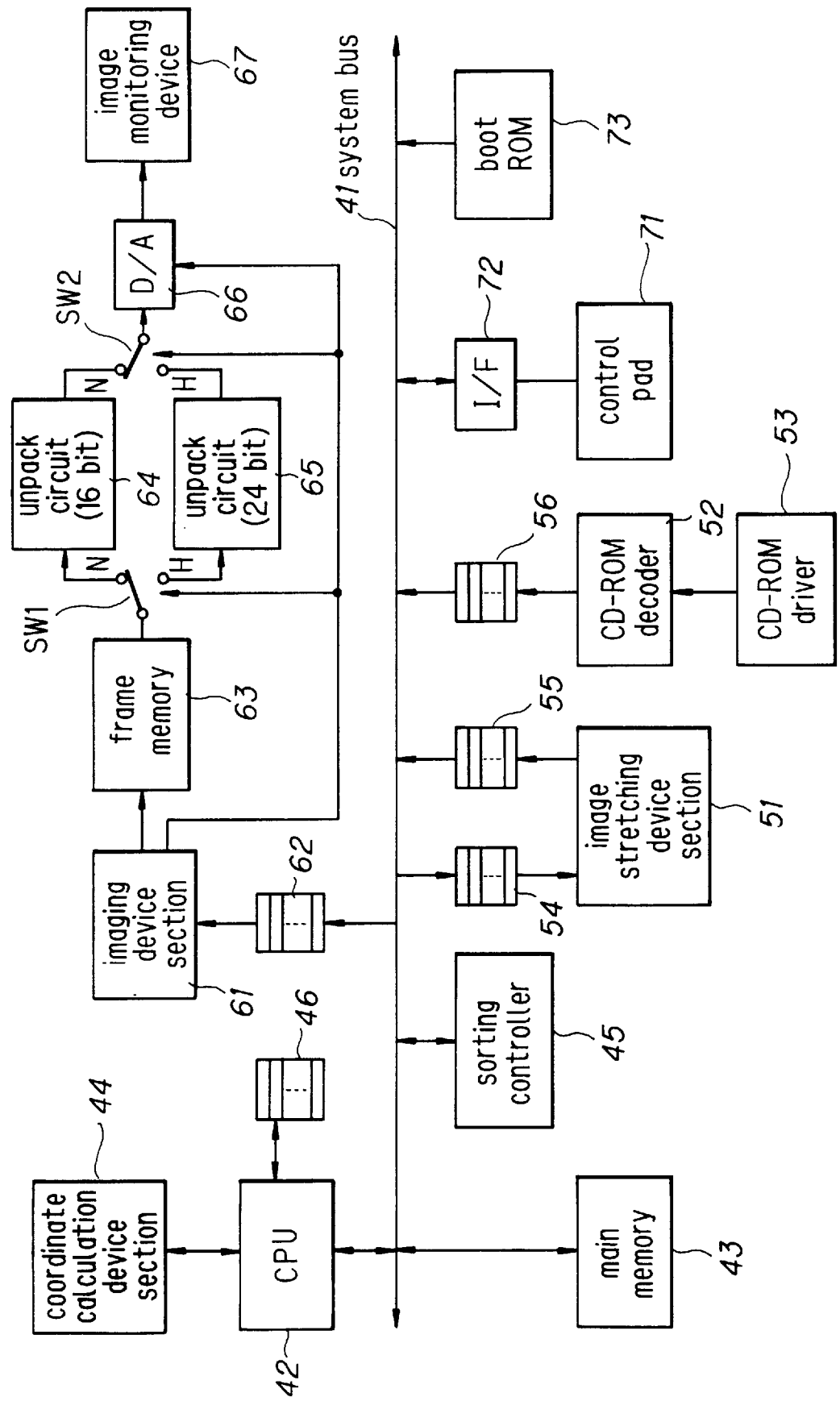
FIG. 1 is a block diagram showing one embodiment of an image processing apparatus according to the present invention.

One embodiment of the invention will now be described with reference to the accompanying drawings. FIG. 1 shows a structural example of an image processing apparatus according to one embodiment of the invention. This example is an example of a game machine provided with a 3D graphic function and a digital motion picture playback function.

In FIG. 1, reference numeral 41 denotes a system bus (main bus). A CPU 42, a main memory 43, a sorting controller 45 are connected to this bus system 41.

Also, an image decompressing device section 51 is connected to the system bus 41 through an input FIFO buffer memory (which will hereinafter be simply referred to as an FIFO buffer) 54 and an output FIFO buffer 55. Also, a CD-ROM decoder 52 is connected through an FIFO buffer 56 and an imaging device section 61 is connected through an FIFO buffer to the system bus 41, respectively.

A frame memory 63 is connected to the imaging device section 61. As described later, data of pictorial images formed in accordance with an imaging command are written and image data decoded by the image decompressing device section 51 are written in the frame memory 63 so that its reproduced image is displayed on an image monitor device 67.

Also, numeral 71 denotes a control pad as an operation input means which is connected to the system bus 41 through an interface 72. Furthermore, a boot ROM 73 in which a program for starting the game machine is stored is connected to the system bus 41.

The CPU 42 carries out the control of the overall apparatus. In the device in this example, two modes, i.e., a first mode (hereinafter referred to as a normal mode) where display image data from the frame memory 63 are used as image data of 1.5 bits/pixel with 5 bits for each of R, G and B (hereinafter referred to as image data of a first bit number) and a second mode (hereinafter referred to as a high resolution mode) where display image data are used as image data of 24 bits/pixel with 8 bits for each of R, G and B (hereinafter referred to as image data of a second bit number) may be selected. The CPU 42 performs the mode switching operation therefor.

Also, in the case where the object is imaged as a mass of a number of polygons, the CPU 42 serves to perform a part of the processing operation. Namely, also as described later, the CPU 42 forms an example of an imaging command for forming the pictorial image corresponding to one image field on the main memory 43.

Also, the CPU 42 has a cache memory 46 and may execute a part of the CPU instruction without fetching information to the system bus 41. A coordinate calculation device section 44 for carrying out a coordinate transformation calculation with respect to the polygons when forming the imaging command is provided as a CPU internal co-processor. The coordinate calculation device 44 performs the transformation from the three-dimensional coordinate transformation and the three-dimension to the two-dimension on the display image field.

Thus, since the CPU 42 includes therein the command cache memory 46 and the coordinate calculation device section 44, the CPU can execute its process to some extent without using the system bus 41. Accordingly, the system bus 41 is likely to be free.

A CD-ROM decoder 52 is connected to a CD-ROM driver 53 for decoding data recorded in the CD-ROM disc mounted on the CD-ROM driver 53. An application program (for example, a program for a game), image data of motion pictures and still pictures which have been image-compressed by, for example, a discrete cosine transformation (DCT), and image data of texture images for decorating the polygons are recorded in the CD-ROM. The application program of the CD-ROM disc includes the polygon imaging commands. An FIFO buffer 56 has a capacity corresponding to one sector of the recording data of the CD-ROM disc.

The image decompressing device section 51 carries out the decompressing process of the compressed image data reproduced from the CD-ROM and is provided with a hardware for a decoder for Huffman codes, an inverse quantization circuit, an inverse discrete cosine and transformation circuit. The process for the decoder portion of the Huffman codes may be processed in the CPU as a software.

In this example, the image decompressing section 51 may carry out the decode process for two modes, i.e., a decode process mode for decompressing the compressed image data to the image data of the first bit number of 15 bits/pixel, and another decode process mode for decompressing the compressed image data to the image data of the second bit number of 24 bits/pixel.

The CPU 42 carries out the mode switching command to the image decompressing device section 51. In accordance with the mode switching command, the image decompressing device section 51 decodes the compression image data into the image data of the first bit number in the normal mode and decodes the compression image data into the image data of the second bit number in the high resolution mode.

Figure 7:
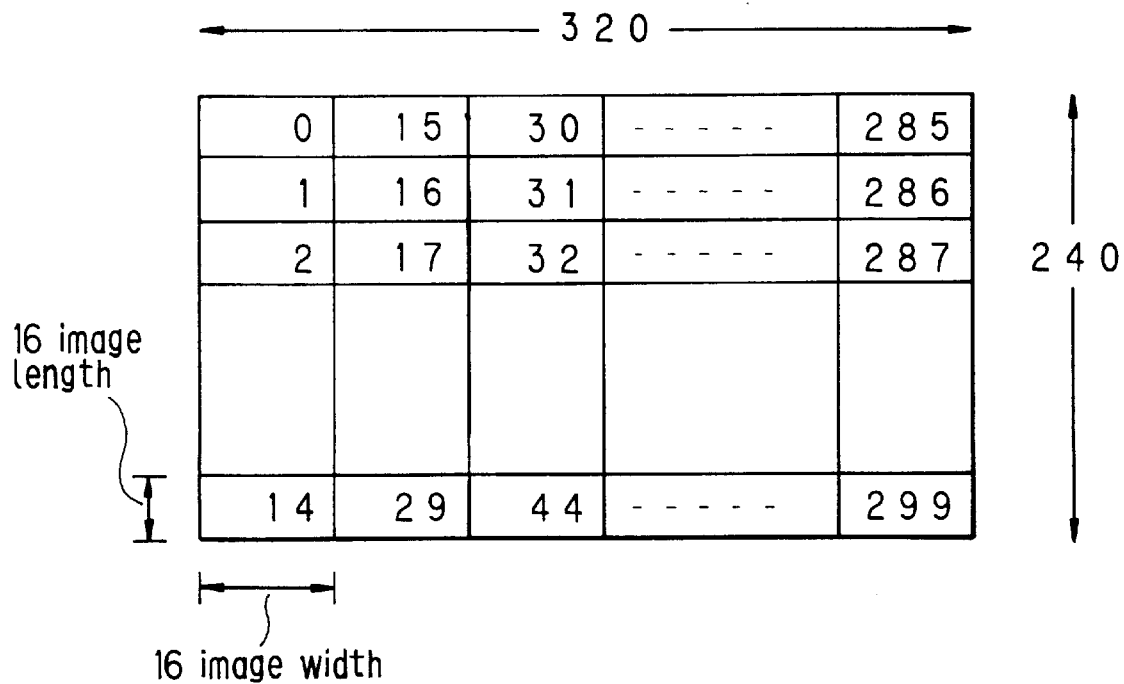
FIG. 7 is a view for illustrating an example of an image of one frame.

In the case of this example, the image decompressing device section 51 divides, as shown in FIG. 7 to be discussed later, a single (one frame) image into small regions of, for example, about 16×16 pixels (each region hereinafter referred to as a micro block), and carries out the image decompressing decode in a micro block unit. A data transfer is carried out to the main memory 43 in the micro block unit. Accordingly, the FIFO buffers 54 and 55 are each provided with a capacity corresponding to the micro block.

The frame memory 63 is connected through a local bus 11 to the imaging section 61. The imaging device section 61 executes the imaging command transferred from the main memory 43 through the FIFO buffer 62, and writes the result to the frame memory 63. The execution of the imaging according to the imaging command is performed only in the normal mode. Then, the pictorial image data are image data of the first bit number with 15 bits/pixel. Incidentally, the FIFO buffer 62 has memory capacity corresponding to one imaging command.

The frame memory 63 is provided with an image memory region for storing the imaging pictures and the motion pictures for display, a texture region for storing texture images, a table memory region for storing color lookup table (color transformation table CLUT). The color lockup table is available for two kinds of modes, i.e., the normal mode and the high resolution mode. In some cases, a part of the high resolution mode may be used for the normal mode.

Figure 2:
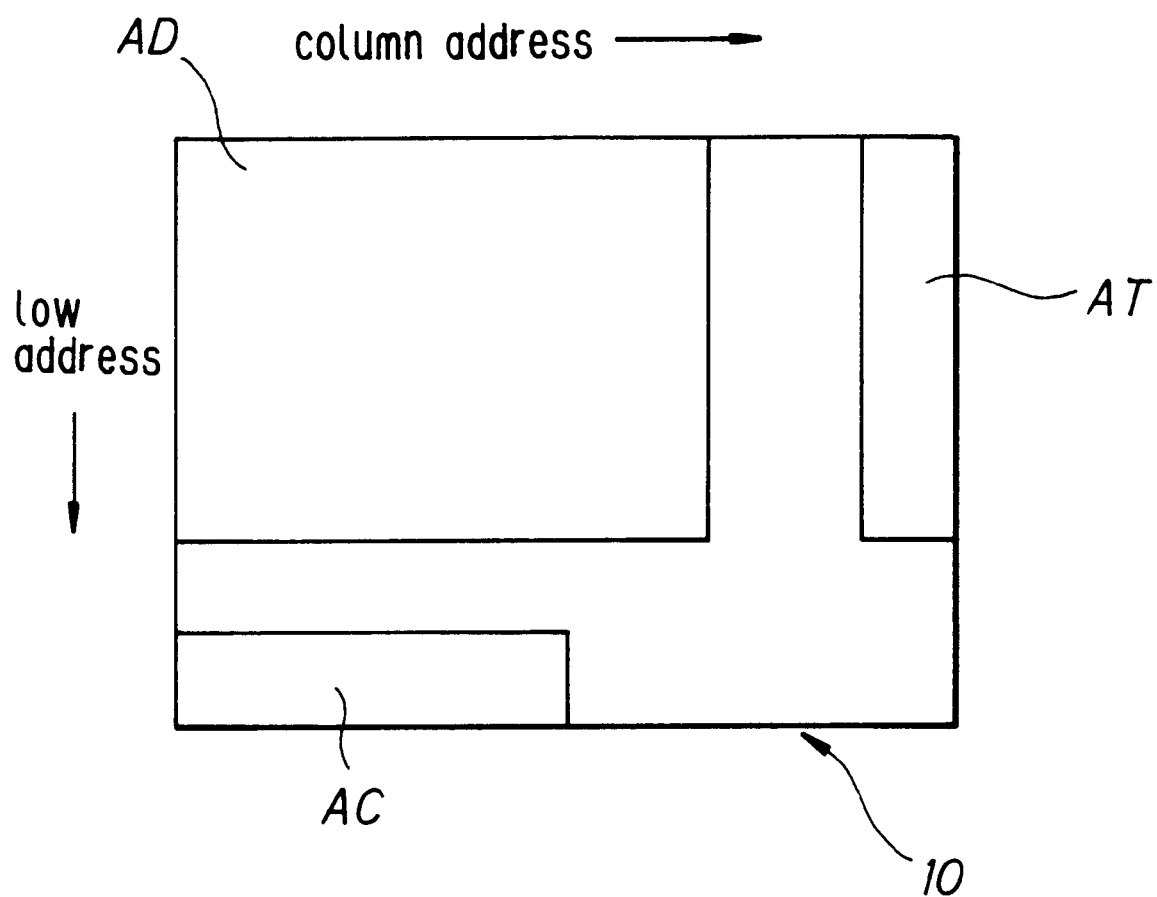
FIG. 2 is a view for illustrating a memory region of the embodiment of the invention.

FIG. 2 shows a memory space for a frame memory 63. The frame memory 63 is addressed by two-dimensional addresses of, column and row. Out of the two-dimensional address space, a region At is used as a texture region. A plurality of kinds of texture patterns may be arranged in the texture region AT. AC designates a table memory region of the color transformation table CLUT.

As described later, the data of the color transformation table CLUT are transferred from the CD-ROM disc through CD-ROM decoder 52 to the frame memory 63 by the sorting controller 45. The texture image data of the CD-ROM disc are decompressed by the image decompressing device section 51 and are transferred through the main memory 43 to the frame memory 63.

Also, in FIG. 2, AD denotes an image memory region which is provided a frame buffer memory corresponding two surfaces of an area for imaging and another area for displaying. In this example, the frame buffer region which is now being used for display is referred to as a display buffer, a frame buffer region which is being used for imaging is referred to as an imaging buffer. In this case, when one is used as an imaging buffer for imaging, the other is used as a display buffer. If the imaging is completed, both buffers are switched over. The switching between the imaging buffer and the display buffer is carried out in synchronism with a vertical synchronism upon the completion of the imaging operation.

In this example, two reading circuits (unpack circuits) are provided for reading the data from the display buffer of the frame memory 63. Namely, the unpack circuit 64 is a reading circuit for the normal mode, which reads the image data from the display buffer of the frame memory 63 for every 15 bits as 15 bits/one pixel (possible to regard it as 2 bytes/one pixel). Also, the unpack circuit 65 is a reading circuit for the high resolution mode, which reads the image data from the display buffer of the frame memory 63 for every 24 bits as 24 bits/one pixel (3 bytes/one pixel).

These unpack circuits 64 and 65 are switched over by switches SW1 and SW2. These switches SW1 and SW2 are depicted for explanation and actually the switching on/off of the unpack circuits 64 and 65 is effected by a switching control signal.

The switching of the unpack circuits 64 and 65 is carried out by a switching control signal from the imaging device section 61. Since the mode switching command is given from the CPU 42 to the imaging device section, the imaging device section 61 forms the switching control signal for the switches SW1 and SW2 based on the command. The mode switching command from the CPU 42 is given upon the switching between the display buffer region and the imaging buffer region of the image memory region AD of the frame memory 63. The CPU 42 recognizes whether the data which are now being processed are the first bit number image data or the second bit number image data upon the writing operation of the image data to the frame memory 63, and hence, it is sufficient that the imaging device section 61 sequentially write the image data, which have been transferred, to the imaging buffer of the frame memory 63.

As described above, the image data that have been read out by the unpack circuit 64 or the unpack circuit 65 are converted into an analog image signal by a D/A converter 66 and are outputted to the image monitoring device 67 and displayed on its image field. Incidentally, in the D/A converter 66, the bit number of the input image data R, G and B varies in response to the mode switching, the switching operation corresponding thereto is effected.

The sorting controller 45 is provided with a function similar to that of a so-called DMA controller, to form a transfer device section for performing the transfer of the image data between the main memory 43 and the image decompressing device section 51 and the transfer of the imaging command column from the main memory 43 to the imaging device section 61. The sorting controller 45 performs the transfer process without intervention of the CPU 42, finding out a time gap when other devices such as the CPU 42 or the control pad 71 make the system bus 41 free. In this case, it is possible for CPU 42 to notice the free state of the system bus 41 to the sorting controller 45 or it is possible for the sorting controller 45 to forcibly demand the free state of the bus against the CPU 42.

The main memory 43 is provided with a memory region for the compressed image data and a memory region for the decompressed image data which are subjected to the decompressing decode process for the image data of the motion or still pictures. Also, the main memory 43 is provided with a memory region for graphic data such as an imaging command column (hereinafter referred to as a packet buffer).

The packet buffer is used for setting the imaging command column and transferring the imaging command row to the imaging device section 61 by the CPU 42 and is co-owned by the CPU 42 and the imaging device section 61.

In this example, in order to operate the processes in parallel by the CPU 42 and the imaging device section 61, in this example, two packet buffers, i.e., packet buffer for setting the imaging command column (hereinafter referred to as a setting packet buffer) and a packet buffer for transfer (hereinafter referred to as an execution packet buffer) are provided. When one is used as the setting buffer, the other is used as the execution packet buffer. When the execution is completed with the execution packet buffer, the functions of the two packet buffers are interchanged. The process of the apparatus will now be described.

[Reading Data from CD-ROM Disc]

When the power source of the apparatus (game machine) shown in FIG. 1 is turned on and the CD-ROM disc is loaded, a program for executing a so-called initialization process for executing the gate of the boot ROM 73 is executed by the CPU 42. The recording data of the CD-ROM disc are installed. At this time, the decode process for each user data is carried out on the basis of identification information ID in user data of each sector of the CD-ROM disc and the data are checked. As a result of the check, the CPU 42 executes the process in response to the playback data with the content indicated by each ID.

Namely, the compression image data, the imaging command and the program which is to be executed by the CPU 42 are read through the CD-ROM driver 53 and the CD-ROM decoder 52 from the CD-ROM disc and are loaded on the main memory 43 by the sorting controller 45. Out of the data, the information of the color transformation table is transferred to the CLUT region of the frame memory 63.

[Processing and Transferring with Respect to Imaging Command Column]

The image of the polygons which form the surface of the object may be stereographically on the two-dimensional image display surface by imaging the polygons in order from one located at the deep position in the depth direction in accordance with Z data which are three-dimensional information. Thus, CPU 42 forms the imaging command column on the main memory 43 so as to perform the imaging operation in the imaging device section 61 in order from the polygon located at the deep position in the depth direction.

By the way, in the computer graphics, a so-called Z buffer method is adopted in which the Z data are stored in the memory for every pixel and the display priority order is determined for the polygons. (The Z buffer method is described in Japanese Patent Application No. Hei 05-190763 filed on Jul. 2, 1993 by the present assignee, which Japanese application has a U.S. patent application now under examination.) However, in the Z buffer method, since the Z data are stored, a large capacity memory has to be used. Accordingly, in this example, the process for determining the display priority order of the polygons is carried out by the CPU 42 as follows.

Figure 3:
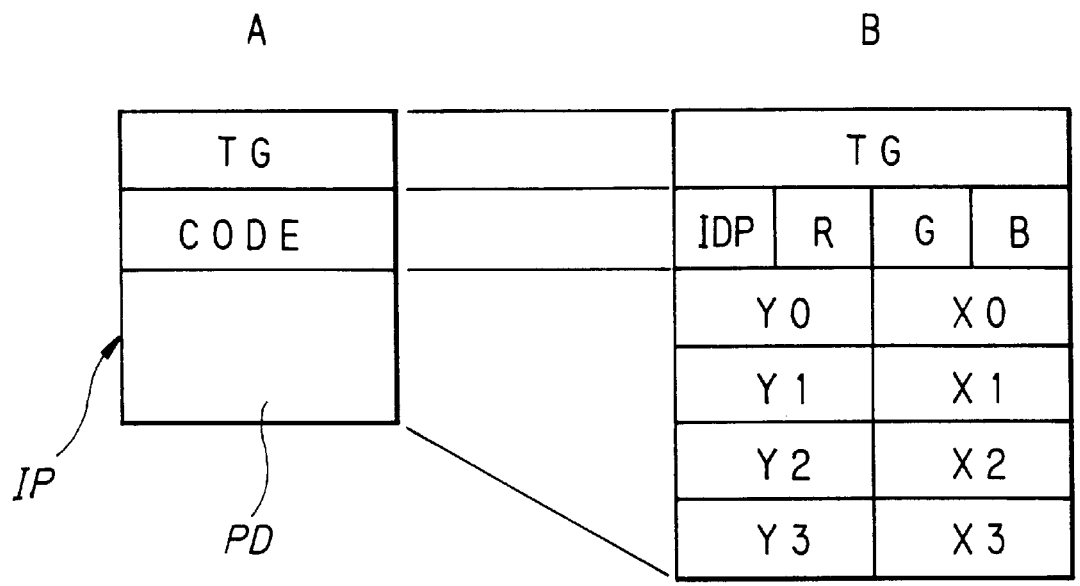
FIG. 3 is a view for illustrating an example of a polygon imaging command in the embodiment of the invention.

For this reason, in this example, the polygon imaging command IP has a structure as shown FIG. 3A. Namely, the polygon imaging command IP is provided with a header on the front side of the polygon imaging data PD. The header portion is provided with a tag TG and a command identification code CODE.

An address on the main memory 43 in which the next imaging command is -stored is written in the tag TG. The command identification code CODE includes identification data IDP which indicates what is a content of the imaging command, and necessary data for the imaging command. The polygon imaging data PD are composed of data such as apex coordinates of the polygons. In the case where the imaging command IP is an imaging command of, for example, a rectangular polygon and an interior of the polygon is mapped with one color, the identification data IPD indicate this fact. The color data for mapping are described as other necessary information.

FIG. 3B shows a case of the imaging command of the rectangular polygon. Four coordinates (X0,Y0), (X1,Y1), (X2,Y2) and (X3,Y3) are described in the polygon imaging data PD. Color data (R,G,B) of three principal colors for mapping the interior of the polygon with one color are included.

The CPU 42 calculates the motions of the object and the eye point and forms the polygon imaging command column on the main memory 43 on the basis of the operational input of the user from the control pad 71. Then, the tag of the polygon imaging command column is rewritten along the display order by the Z data. At this time, the address of each imaging command on the main memory 43 is not rewritten but only the tag is rewritten.

When the imaging command column is completed, the sorting controller 45 follows the tag TG of each imaging command in order and transfers the data from the main memory 43 to the imaging device section 61 for every one imaging command. For this reason, it is sufficient that the FIFO buffer 62 is provided with the capacitance corresponding to one imaging command.

Figure 4:
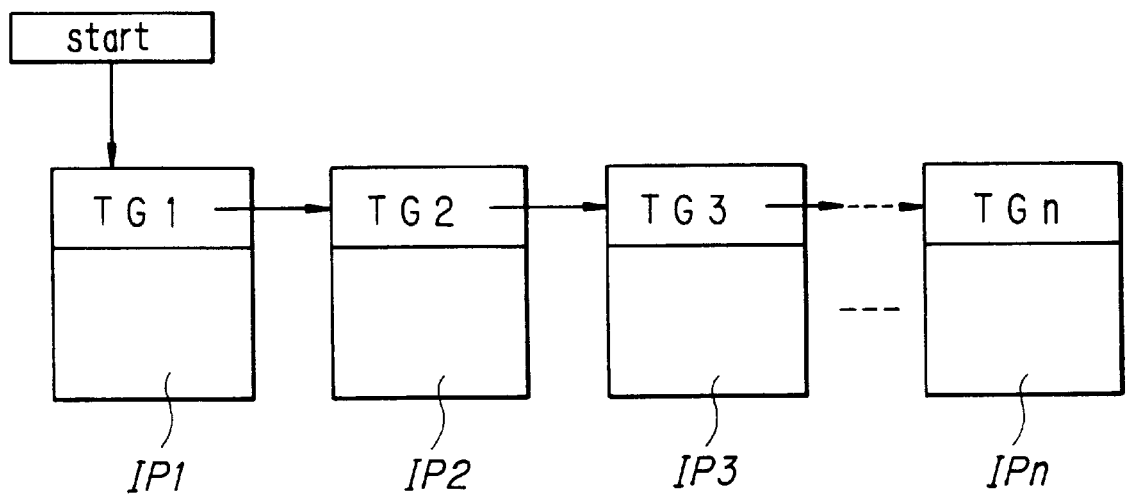
FIG. 4 is a view for illustrating an imaging display sequence of the polygon in the embodiment of the invention.

In the imaging device section 61, since the data that have been fed are already sorted, as shown in FIG. 4, the polygon imaging commands IP1, IP2, IP3, . . . , IPn are executed in accordance with the tags TG1, TG2, TG3, . . . , TGn in this order, and the result is stored in the image memory region AD of the frame memory 63.

Upon imaging the polygons, the data are fed to a gradient calculation unit of the imaging device 61 to perform the gradient calculation. The gradient calculation is a calculation for seeking a gradient of the plane of the mapping data when the interior of the polygonal shape is filled with the mapping data in the polygon imaging. In case of the texture, the polygon is filled with the texture image data, and in case of glow shading, the polygon is filled with luminance brightness values.

In the case where the texture is attached to the polygon forming the surface of the object, the texture data of the texture region AT are subjected to the two-dimensional mapping transformation.

Figure 5:
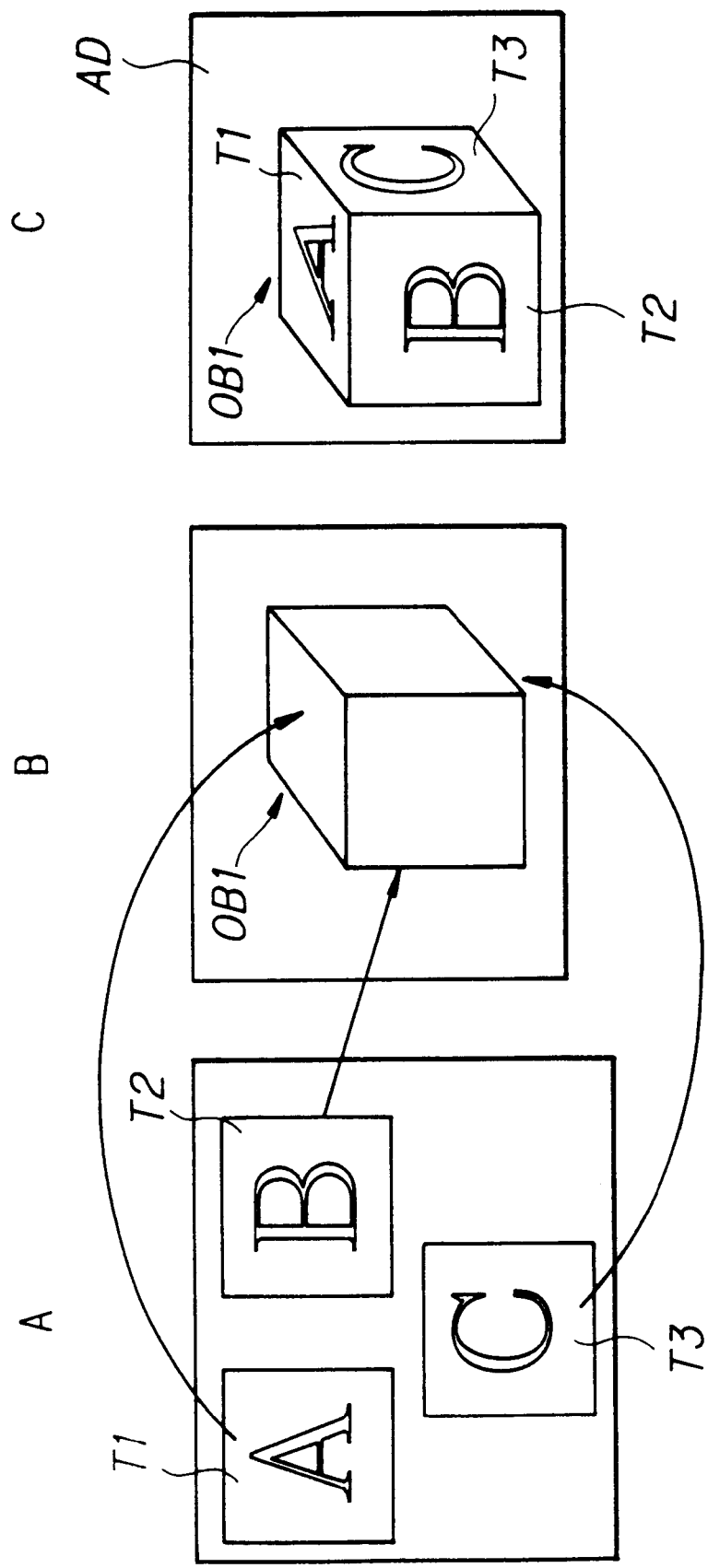
FIG. 5 is a view for illustrating texture mapping.

For example, the texture patterns T1, T2 and T3 as shown in FIG. 5A are transformed into the coordinate on the two-dimensional screen so that they are suitable to the polygon of each surface of the object as shown in FIG. 5B. The texture patterns T1, T2 and T3 which have been thus mapped and transformed are attached to the surface OB1 as shown in FIG. 5C. Then, this is arranged in the image memory region Ad and is displayed on the display image field of the-image display monitor 65.

In case of the still picture texture, the texture pattern on the main memory 43 is transferred to the texture region AT on the frame memory 63 through the imaging device section 61. In the imaging device section 61, this is attached to the polygon. Thus, the texture of the still picture is realized on the object. The data of the texture pattern of this still image may be stored in the CD-ROM disc.

Furthermore, it is possible to provide the texture of the motion picture. In case of the motion pictorial texture, as described later, the motion data which have been decoded for decompressing in the image stretching device section 51 are fed to the texture region AT on the frame memory 63. Since the texture region AT is provided in the frame memory 63, the texture pattern itself may be rewritten for every frame. Thus, when the motion picture is fed to the texture region AT, the texture is automatically written and changed for every one frame. If the texture mapping to the polygon is carried out by the motion picture of the texture region AT, the motion picture texture is realized.

[Decompressing and Transfer of Compression Image Data]

Out of the input data of the main memory 43, after CPU 42 has executed the decode process of the Huffman codes, the compression data are again written in the main memory 43 by the CPU 42. Then, the sorting controller transfers the image data, that have been processed through the Huffman code process, from the main memory 43 through the FIFO buffer 54 to the image decompressing device section 51. In advance to this, the CPU 42 feeds to the image decompressing device section 51 an instruction whether the decode is to be carried out in the normal mode or in the high resolution mode. In the image decompressing device section 51 carries out the inverse quantization process and the inverse DCT process and carried out the decompressing decode process of the image data in the mode in accordance with the instruction from the CPU 42.

The sorting controller 45 transfers the extended image data through the FIFO buffer 55 to the memory 43. In this case, as described above, the image decompressing device section 51 performs the decompressing process in the micro block unit. For this reason, the compression data in the micro block unit are transferred from the main memory 43 to the input FIFO buffer 54 by the sorting controller 45. Then, when the decompressing decode process is completed, the image decompressing device section 51 introduces the decompressed image data of that result into the output FIFO buffer 55, and at the same time derives the compression data of the next micro block from the input FIFO buffer 54 to thereby perform the decompressing decode process.

If the system bus 41 is free and the output FIFO buffer 55 of the image decompressing device section 51 is not empty, the sorting controller 45 transfers the extended image data of one micro block to the main memory 43, and transfers the compression image data of next one micro block from the main memory 43 to the input FIFO buffer 54 of the image decompressing device section 51.

The CPU-42 transfer the decompressing data through the imaging device section 61 to the frame memory 63 at the time when a predetermined amount of micro blocks of the extended image data is accumulated in the main memory 43. In this case, if the decompressed image data are transferred to the image memory region AD of the frame memory 63 are transferred to the image memory region AD, the data are displayed without any modification on the image monitoring device 65 as the background motion picture. Also, there are some cases where the data are transferred to the texture region AT of the frame memory 63. The image data of the texture region AT are used for modification of the polygon as the texture image.

In this case, the pictorial image is synthesized with the background motion picture, the image data of the background motion picture is decompressed decoded as the image data of the first bit number in the normal mode and are transferred to the frame memory 63. Also, the extended image data are transferred to the texture region AT, in the same way, the data is decompression decoded as the image data of the first bit number in the normal mode. The reason for this is that the pictorial image data is composed of the first bit number. Then, in the case where the background image is not synthesized with the pictorial image, the data is decompression decoded as the image data of the second bit number with the high resolution.

Incidentally, the image data extended and decoded in the image decompressing device section 51 are transferred from the main memory 43 to the frame memory 63, in this example, the transfer command is used as follows. Such a conversion of the decompressed image data into the transfer command type is carried out in the CPU 42.

Figure 6:
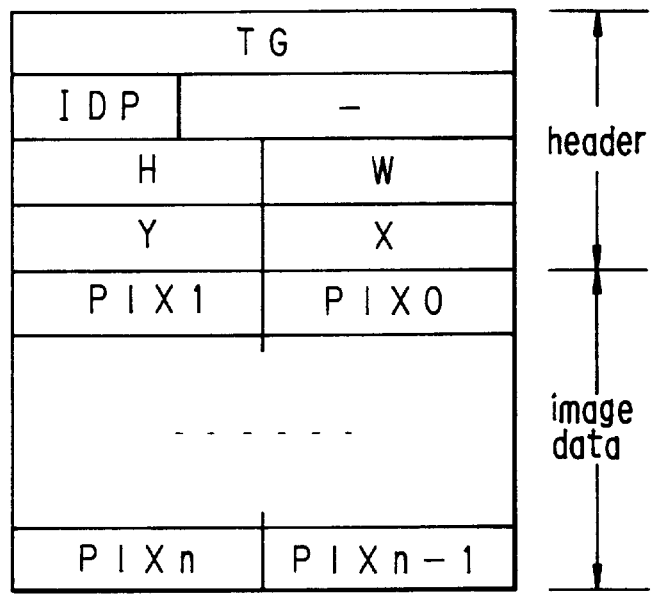
FIG. 6 is a view for illustrating an example of a data structure in transferring the image data in the embodiment of the invention.

Namely, FIG. 6 is a view showing a structure of this transfer command. The transfer command has almost the same type as that of the imaging command and is provided at its leading end with a tag TG and subsequently with identification data IDP. In the same manner as the imaging command, the tag TG is composed of an address value of the main memory 43 in which a next imaging command or transfer command is stored. Data representative of the fact that this is the transfer command for the stretched image data are described in the identification data IDP.

Then, in FIG. 6, the next data "H" and "W" show a high and a width of the decompressing data region to be transferred. The height and the width correspond to the region of the image field of one frame. Also, the data "X" and "Y" indicate the coordinate of the positions where the data are to be transferred. Each coordinate indicates the coordinate at the upper and left region of the rectangular because the transfer region is rectangular. Each coordinate is a coordinate within the region AD if the transfer position is within the image memory region AD of the frame memory, and is a coordinate within the region AT if the transfer position is within the region AT.

In case of the transfer command of the decompressed image data, the region from the tag TG to the coordinate X, Y and the size of the header is identified by the identification data IDP. A region from the identification data IDP to the coordinate X, Y corresponds to the command identification code CODE of the imaging command shown in FIG. 3.

The transfer command includes the pixel data PIX0, PIX1, PIX2, . . . , PIXn of the decompressed image data subsequent to the header. As described above, each pixel data have 15 bits in the normal mode and 24 bits in the high resolution mode. The decompressed image data are transferred from the main memory 43 through the imaging device section 61 to the frame memory 63 in the unit of the transfer command by the sorting controller 45.

By the way, as mentioned above, the image decompressing device section 51 divides one frame image into micro blocks composed of length×width=16×16 for carrying out the decompressing decode in the micro block unit. Now, for example, assuming the image composed of one frame of length x width=320×320, one frame is divided into 300 micro blocks as shown in FIG. 7.

Figure 8:
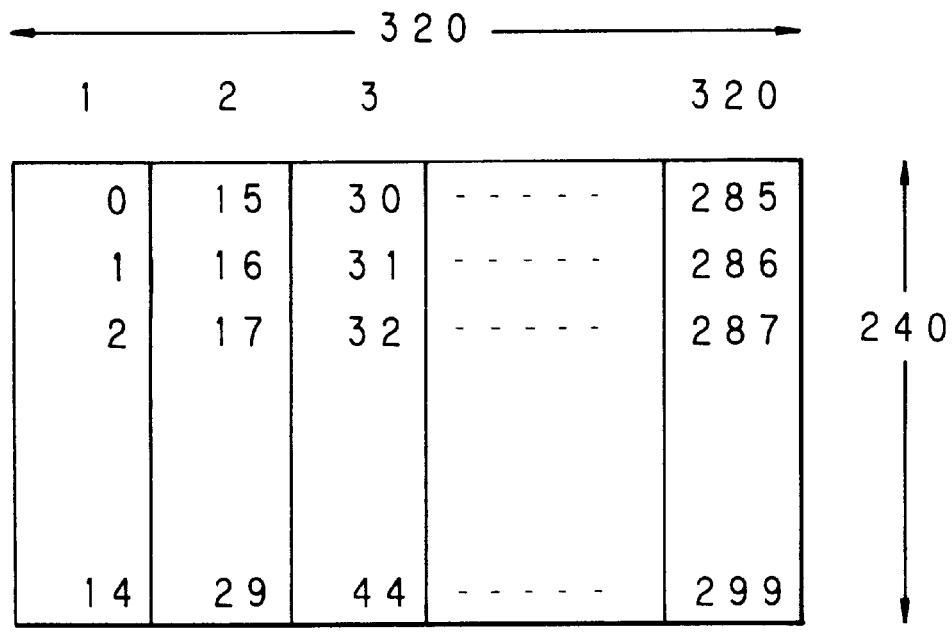
FIG. 8 is a view for illustrating a transfer unit of the image data in the embodiment of the invention.

When the 300 micro blocks are transferred to the imaging device section 61, in the case where the transfer command is formed in the micro block unit, the overhead of the header portion is too large. Therefore, in this example, as shown in FIG. 1, a plurality (15 in FIG. 8) of micro blocks in a longitudinal column are coupled, and this is used as a unit to be fed by the transfer command.

Figure 9:
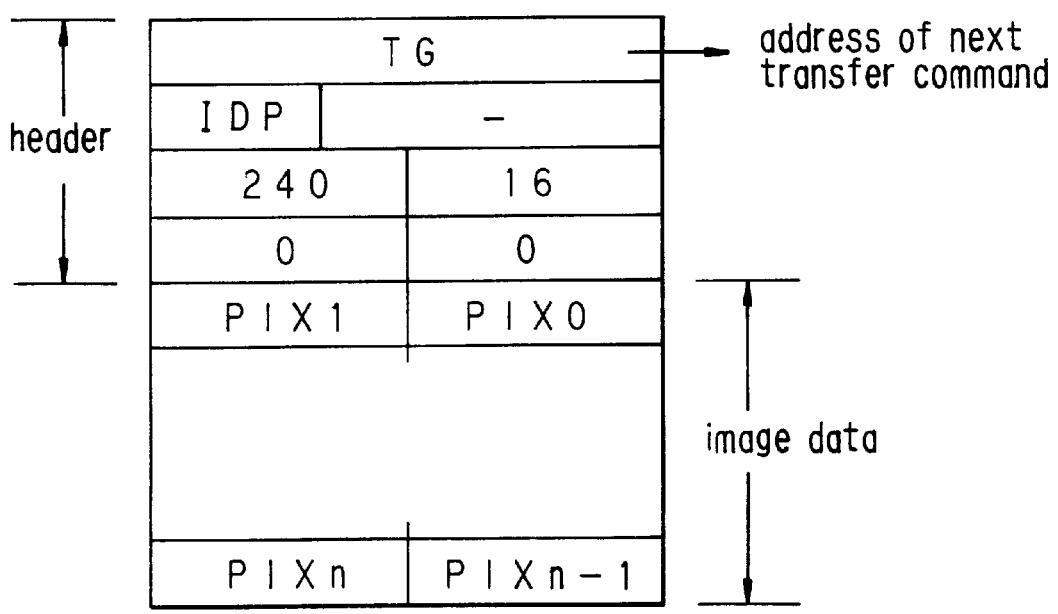
FIG. 9 is a view for illustrating an example of a data structure in transferring the image data in the embodiment of the invention.

An example of a first transfer command for one frame is shown in FIG. 9. Namely, in FIG. 9, the coordinate X, Y is 0, 0. In the next transfer command, the coordinate X, Y is 16, 0.

Thus, since the decompressed image data are converted into the transfer command type in the same manner as in the imaging command, the transfer by the sorting controller 45 by mixing the imaging command of the polygon and the transfer command the imaging and formation of the image may be executed in the frame memory 63 by the imaging device section by utilizing the tag TG. [Explanation of Image Date Reading Process from Frame Memory 63]

First of all, the CPU 42 applies the command to the imaging device section 61 to output the image data of one frame buffer region A (becoming the display buffer) of the image memory region AD of the frame memory 63 to the image monitoring device 67. At this time, the CPU 42 also feeds the mode switching control signal for instructing the normal mode or high resolution mode to the imaging device section 61.

Figure 10:
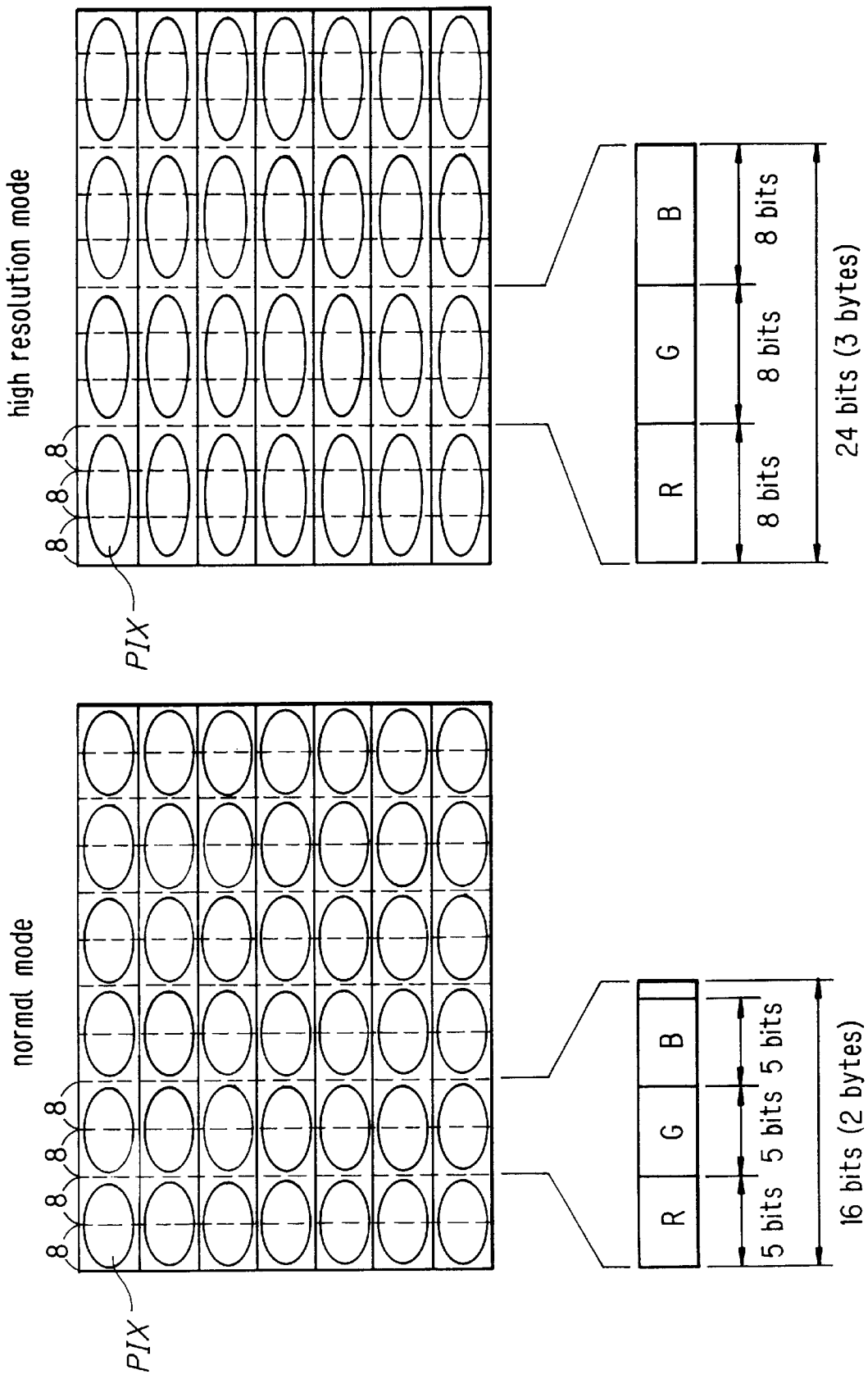
FIG. 10 is a view for illustrating a plurality of examples of the bit number per one pixel in the embodiment of the invention.

When the normal mode is assigned, the imaging device section 61 switches the switches SW1 and SW2 to an N side and selects the unpack circuit 64. At this time, each of the pixel data PIX is written for every 15 bits (2 bytes) in the display buffer of the image memory region AD of the frame memory 63 as encircled by ellipses in FIG. 10A.

As described above, the unpack circuit 64 reads the image data for every 15 bits (2 bytes) from the display buffer of the image memory region AD of the frame memory and sequentially transfers the read data into the A/D converter 66 for converting the analog image signal. Thus, the playback image is formed on the image field of the image monitoring device 67. In this case, what is displayed in the normal mode is:

i) the pictorial image only;

ii) the synthetic image which has been obtained from the texture image attached to the imaged polygon;

iii) the synthetic image which is imaged as a number of polygons in the background image composed of the motion picture or still picture of 15 bits/pixel obtained by the decompressing decode;

iv) the motion picture or still picture of 15 bits/pixel obtained by the decompressing decode only, or the like.

When the high resolution mode is assigned, the imaging device section 61 switches the switches SW1 and SW2 to an H side and selects the unpack circuit 65. At this time, each of the pixel data PIX is written for every 24 bits (3 bytes) in the display buffer of the image memory region AD of the frame memory 63 as encircled by ellipses in FIG. 10B.

The unpack circuit 65 reads the image data for every 24 bits (3 bytes) from the display buffer of the image memory region AD of the frame memory and sequentially transfers the read data into the A/D converter 66 for converting the analog image signal. Thus, the playback image is formed on the image field of the image monitoring device 67. In this case, what is displayed in the high resolution mode is the motion picture or still picture of 24 bits/pixel obtained by the decompressing decode.

While the image data of the one frame buffer A are read out, the CPU 24 produces the data, to be subsequently transferred to the imaging device section 61, in the main memory 61. In case of the production of the imaging command column, the operational input of the control pad 71 is read, the coordinate value of the imaging command column of one packet buffer (becoming the setting packet buffer) of the main memory 43 is renewed in response to this operational input, and at the same time, the tag of each imaging command of the imaging command column is rewritten. In the case of the decompressed image data, the data are converted into the transfer command type as described above. The CPU 42 recognizes that the data are the decompressed image data of 15 bits/pixel or 24 bits/pixel.

While the CPU 42 processes the imaging command formation or the change of the decompressed image data into the transfer command type, the imaging command column or the decompressed image data are transferred from the main memory 43 to the other frame buffer region B (becoming the imaging buffer) by the sorting controller 45. At this time, the CPU recognizes whether the transferred data are the imaging command column, the decompressed image data of 15 bits/pixel or the decompressed image data of 24 bits/pixel.

Subsequently, when all the imaging command column or transfer command column is transferred from the main memory 43, the CPU 42 uses the other frame buffer region B of the frame memory 63 as the display buffer, and commands the imaging device section 61 to read the pictorial image data or the decompressed image data and to output the data to the imaging monitor 65. In this case, in the same way as described before, since the CPU 42 also feeds to the imaging device section 61 the mode switching signal for instructing that the data are in the normal mode or high resolution mode, as described before, the imaging device section 61 performs the switching of the switch SW1 and SW2 and carries out the reading process in response to the normal mode and the high resolution mode. Incidentally, in this case, simultaneously, the frame buffer region A of the frame memory is switched to the imaging buffer.

While the image data are read out by using the other display buffer region B as the display buffer region, as described above, the CPU 42 produces the data to be subsequently transferred to the imaging device section 61, in the main memory 43. While the CPU 42 processes the imaging command formation or the change of the decompressed image data into the transfer command type, the imaging command column or the decompressed image data are transferred from the main memory 43 to the one frame buffer region A (becoming the imaging buffer) by the sorting controller 45.

The motion picture may be displayed by repeating the foregoing operation. In addition, the unpack circuits 64 and 65 are switched in response to the normal mode and the high resolution mode and the image data written in the frame memory 63 may be processed for readout in response to the quality of the image.

Incidentally, in the foregoing description, the case of two kinds of the bit numbers per one pixel has been exemplified. However, the invention may be equally applied to the case of three or more kinds of the bit numbers per one pixel.

Also, in the foregoing example, the image data or the application program is recorded on the CD-ROM disc. However, any other recording medium such as a semiconductor memory like, for example, a magnetic disc, a memory card may be used as the recording medium.

Also, the DCT is used for the data compression method of the image but any other various kinds of image data compression methods may be used.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. In an image processing apparatus for playing back frames of image data including a computer graphics image in which each pixel of said image data is represented by one of a first number of bits per pixel and a second number of bits per pixel being larger than said first number stored in a frame memory having a respective memory capacity, said image processing apparatus comprising:

recognizing means for recognizing whether the image data written in said frame memory is to be displayed at said first number of bits per pixel or said second number of bits per pixel;

first image data reading means for reading the image data from said frame memory in which each pixel is represented by the first number of bits;

second image data reading means for reading the image data from said frame memory in which each pixel is represented by said second number of bits; and switching means, responsive to said recognizing means, for switching between said first image data reading means and said second image data reading means.

2. An image processing apparatus according to claim 1 further comprising:

imaging means for performing an imaging operation at the instruction of an imaging command for forming said computer graphics image with each pixel represented by said second number, on said frame memory; and image data writing means for sequentially writing the computer graphics image operated on by said imaging means to said frame memory.

3. The image processing apparatus according to claim 2, wherein said image data includes motion pictures and still pictures and said computer graphics image is a 3-D image, said apparatus further comprising means for composing said image data and said computer graphics image for display in the same frame.

4. The image processing apparatus according to claim 3, further comprising an operation input means for inputting said imaging command.

5. The image processing apparatus according to claim 4, further comprising a disc playback section, wherein said image data are reproduced by a disc loaded on said disc playback section.

6. The image processing apparatus according to claim 5, further comprising a D/A converting circuit for converting a digital signal into an analog signal, wherein the digital signal is inputted into said D/A converting circuit and is converted into the analog signal which is to be outputted from said D/A converting circuit by said switching means.

7. The image processing apparatus according to claim 6, further comprising a common system bus for connecting signals from said input means, said imaging means and said disc playback section.

8. The image processing apparatus according to claim 7, further comprising buffer memories between said common system bus and said imaging means and said disc playback section.

9. An image processing apparatus according to claim 1, wherein said computer graphics image is a polygonal image comprising a plurality of polygons forming a 3-D computer graphics image.

10. An image processing apparatus according to claim 1, wherein said computer graphics image is a polygonal image comprising a video game computer graphics image.

11. The apparatus of claim 1, further comprising decompressing means operable in a normal mode for decompressing said image data to first decompressed image data with said first number of bits per pixel and a high resolution mode for decompressing said image data to second decompressed image data with said second number of bits per pixel.

12. The apparatus according to claim 11, further comprising means for storing said first decompressed image data and said second decompressed image data to said frame memory.

13. The apparatus according to claim 1, wherein said frame memory stores in the same frame both image data having the first number of bits per pixel and image data having the second number of bits per pixel.

14. The apparatus according to claim 1, wherein the number of bits per pixel is related to the number of colors with which the image data is displayed; wherein said image data with said second number of bits is adapted to be displayed with a higher number of colors than said image data with said first number of bits.

15. The apparatus according to claim 1, wherein said computer graphics image is a three-dimensional computer graphics image; further comprising a three-dimensional image processor for processing said computer graphics image.

16. The apparatus according to claim 1, wherein said recognizing means recognizes whether the image data written in said frame memory is to be displayed at said first number of bits per pixel or said second number of bits per pixel as a function of image quality and memory capacity of said frame memory.

17. A method for playing back frames of image data including a computer graphics image in which each pixel of said image data is represented by one of a first number of bits per pixel and a second number of bits per pixel stored in a frame memory having a respective memory capacity, said method comprising the steps of:

recognizing whether the image data written in said frame memory is to be displayed at said first number of bits per pixel or said second number of bits per pixel;

switching, responsive to said step of recognizing, between reading the image data from said frame memory in which each pixel is represented by the first number of bits per pixel and reading the image data from said frame memory in which each pixel is represented by the second number of bits per pixel.

18. The method of claim 17, further comprising the step of decompressing in a normal mode said image data to first decompressed image data with said first number of bits per pixel and decompressing in a high resolution mode said image data to second decompressed image data with said second number of bits per pixel.

19. The method according to claim 18, further comprising the step of storing said first decompressed image data and said second decompressed image data to said frame memory.

20. The method according to claim 17, further comprising the step of storing in said frame memory in the same frame both image data having the first number of bits per pixel and image data having the second number of bits per pixel.

21. The method according to claim 17, wherein the number of bits per pixel is related to the number of colors with which the image data is displayed; further comprising the step of displaying said image data with said second number of bits with a higher number of colors than said image data with said first number of bits.

22. The method according to claim 17, wherein said computer graphics image is a three-dimensional computer graphics image; further comprising the step of processing said three-dimensional computer graphics image.

23. The method according to claim 17, wherein said recognizing step recognizes whether the image data written in said frame memory is to be displayed at said first number of bits per pixel or said second number of bits per pixel as a function of image quality and memory capacity of said frame memory.

* * * * *